United States Patent [19]

Grenfell et al.

[11] Patent Number: 5,532,310

[45] Date of Patent: Jul. 2, 1996

[54] SURFACTANTS TO CREATE FLUOROPOLYMER DISPERSIONS IN FLUORINATED LIQUIDS

[75] Inventors: Mark W. Grenfell, Woodbury; Richard M. Flynn, Mahtomedi; Patricia M. Savu, Maplewood, all of Minn.

[73] Assignee: Minnesota Mining and Manufacturing Company, St. Paul, Minn.

[21] Appl. No.: 430,556

[22] Filed: Apr. 28, 1995

[51] Int. Cl.$^6$ .............. C08K 5/02; C08K 5/16; C08L 27/18; C08L 27/12

[52] U.S. Cl. .......... 524/463; 524/244; 524/462; 524/520; 524/544; 524/545; 524/546

[58] Field of Search ............... 524/462, 463, 524/544, 545, 546, 520, 244

[56] References Cited

U.S. PATENT DOCUMENTS

| | | | |
|---|---|---|---|
| 2,559,752 | 7/1951 | Berry | 260/29.6 |
| 2,612,484 | 9/1952 | Bankoff | 260/29.6 |
| 2,642,416 | 6/1953 | Ahlbrecht et al. | 260/83.5 |
| 2,750,350 | 6/1956 | Kroll | 260/29.6 |
| 2,937,156 | 5/1960 | Berry | 260/29.6 |
| 2,951,047 | 8/1960 | Lantos | 260/17 |
| 3,450,755 | 6/1969 | Ahlbrecht | 260/556 |
| 3,778,381 | 12/1973 | Rosano et al. | 252/311 |
| 3,792,977 | 2/1974 | Guenthner | 8/169 |
| 4,186,121 | 1/1980 | Gangal | 260/29.6 |
| 4,587,139 | 5/1986 | Hagan et al. | 427/130 |
| 4,609,497 | 9/1986 | Cope | 260/408 |
| 5,089,152 | 2/1992 | Flynn et al. | 252/194 |
| 5,223,593 | 6/1993 | McAllister et al. | 526/245 |
| 5,270,378 | 12/1993 | Johnson et al. | 524/520 |
| 5,380,644 | 1/1995 | Yonkoski et al. | 430/617 |

FOREIGN PATENT DOCUMENTS

| | | | |
|---|---|---|---|
| 0129254 | 5/1990 | Japan | 524/462 |
| 7100111 | 7/1971 | Netherlands | 524/546 |
| 2055874 | 3/1981 | United Kingdom | 524/546 |
| 0005100 | 3/1993 | WIPO | 524/546 |

OTHER PUBLICATIONS

*Encyclopedia of Chemical Technology,* "Fluorine Compounds, Organic (Higher Acids)," 4th Ed., vol. 11, pp. 551–558, John Wiley & Sons, Inc. (1994).

*Encyclopedia of Chemical Technology,* "Coating Processes," 3rd Ed., vol. 6, pp. 386–426, John Wiley & Sons, Inc. (1979).

*Primary Examiner*—Peter A. Szekely
*Attorney, Agent, or Firm*—Gary L. Griswold; Walter N. Kirn; John A. Burtis

[57] ABSTRACT

This invention provides a fluoropolymer dispersion useful for coating applications. The dispersion is a homogeneous and non-ozone depleting dispersion comprising a lubricious fluoropolymer, an inert perfluorinated liquid, a polar solvent, and an effective amount of a surface active agent selected from the group consisting of:

a. perfluoroaliphatic amidoalkanols;

b. polymerized products formed from the reaction of a mixture comprising a hydrophilic monomer and a monomer of the general formula:

$$C_nF_{2n+1}(OC_pF_{2p})_x(OC_qF_{2q})_y(Q)_g(CH_2)_mO-\overset{\overset{\displaystyle O}{\|}}{C}-CX'=CH_2$$

wherein p and q are integers between 1 and 4 inclusive, x and y are integers between 0 and 4 inclusive, m is 1 or 2, n is an integer between 3 and 10 inclusive, X' is either a methyl group or a single hydrogen atom, g is 0 or 1, and Q is a sulfonamido constituent group according to the formula:

$$-SO_2N-\underset{R^1}{|}$$

wherein $R^1$ is a hydrogen or a lower alkyl group having from 1 to 6 carbon atoms and wherein the hydrophilic monomer is present in an amount constituting inclusively between five and twenty-five weight percent of the reactant mixture when the polar solvent employed is a polar organic solvent and wherein the hydrophilic monomer is present in an amount constituting inclusively between one and twenty-five weight percent of the reactant mixture when the polar solvent employed is water; and c. Perfluorinated ether acids according to the general formula:

$$C_zF_{2z+1}(OCF_2)_s(OC_2F_4)_t(OCFCF_2)_v(O)_wCFYC(O)OH\underset{CF_3}{|}$$

wherein z is between 1 and 10 inclusive, s is between 0 to 4, t is between 0 to 4, v between 0 to 5, w is 0 or 1, and Y is either F or $CF_3$.

12 Claims, No Drawings

SURFACTANTS TO CREATE FLUOROPOLYMER DISPERSIONS IN FLUORINATED LIQUIDS

FIELD OF THE INVENTION

This invention relates to the preparation of dispersions of fluoropolymers. More particularly, it relates to the preparation of stable fluid dispersions of polytetrafluoroethylene wherein the continuous phase includes a perfluorinated, chlorine-free liquid. In another aspect, the present invention relates to fluoropolymer-coated articles manufactured using a stable fluoropolymer dispersion wherein the continuous phase includes an inert perfluorinated liquid. In yet another aspect, this invention relates to the preparation of an emulsion of a perfluorinated liquid and a polar solvent.

BACKGROUND OF THE INVENTION

Polytetrafluoroethylene, sometimes referred to as PTFE, is a widely available and widely useful fluoropolymer employed in a variety of applications such as a dry lubricant in the manufacture of, for example, medical hardware equipment, as a release agent, and as an industrial thickener. Polytetrafluoroethylene dispersed in a suitable solvent system may be applied onto a selected object or substrate by any number of known industrial coating processes. Dip coating, spray coating, and spin disk coating are among the application methods most useful to coat polytetrafluoroethylene. In accordance with these coating methods, a substrate or object to be coated with a fluoropolymer is exposed to the dispersed fluoropolymer, either by dipping the object or substrate directly into the dispersion, by spraying the dispersion onto the object or substrate, or by using centrifugal force to distribute the fluoropolymer about a spinning platform. The solvent or solvents used to create the dispersion are then removed, e.g. by ambient evaporation or by baking, leaving an even fluoropolymer coat. For a detailed description of these coating methods, see Stanley C. Zink, Coating Processes, 6 Kirk-Othmer Encyclopedia of Chemical Technology 386–426 (3d ed. 1979) (detailing methods of dip and spray coating) and U.S. Pat. No. 4,587,139 (describing spin disk coating).

Some dispersions useful for coating processes are commercially available. Generally, these dispersions contain between twenty and thirty weight percent solid polytetrafluoroethylene in a liquid phase solvent system containing one or more organic solvents or water. A commercially available dispersion of this type is DuPont Vydax™ Fluorotelomer Dispersion, a low molecular weight polytetrafluoroethylene dispersed in water or isopropanol. For use in coating applications, these dispersions are most often diluted with a suitable solvent to between one and three weight percent solids prior to processing.

Prior to the phase-out of chlorofluorocarbons (CFCs) mandated by the Montreal Protocol, many commercially available fluoropolymer dispersions were dispersed in CFC-113 (1,1,2-trichlorotrifluoroethane) as this fluid, apart from its environmental impact, is remarkably well adapted to process conditions; it is highly volatile, is extremely inert, is both nontoxic and nonflammable, and is highly compatible with a wide range of materials. CFC-113, for example, boils at 47° C.

Currently available commercial dispersions, such as DuPont's Vydax™ Fluorotelomer Dispersion line, are sold in either isopropanol or water and are more poorly adapted to easy industrial use. Since both isopropanol and water are relatively nonvolatile (with boiling points of 82° C. and 100° C. respectively at standard pressure), fully diluted dispersions in these liquids can result in uneven coating due to their slow evaporative rates. Additionally, isopropanol-containing dispersions are flammable, and water containing dispersions can corrode ferrous metal substrates.

As a partial solution to the problems of incorporating water- and isopropanol-based PTFE dispersions into coating applications, some commercial manufacturers employ various hydrochlorofluorocarbons (HCFCs) alone and in combination with perfluorocarbons (PFCs) as preprocessing diluents for isopropanol- and water-based commercial dispersions. Although HCFCs possess the advantages of higher volatility and better solvency with a wider range of materials (HCFC 141 b, for example, has a boiling point of only 32° C.), because of their high solvency, they often degrade polymeric substrates and because they contain chlorine, they contribute to stratospheric ozone depletion and are also scheduled for phase-out by the Montreal Protocol. PFCs are, like HCFCs, highly volatile, nontoxic, and nonflammable. But unlike HCFCs, PFCs are chemically inert with respect to polymeric materials, and since they are chlorine free, they do not contribute to stratospheric ozone depletion. PFCs therefore can be used as diluents in combination with HCFCs to reduce the aggressiveness of the HCFC action on polymeric substrates. But because this combination still employs HCFCs, their use only reduces, and does not eliminate, ozone depletion effects.

SUMMARY OF THE INVENTION

Briefly, in one aspect, the present invention provides a homogeneous, and non-ozone depleting fluoropolymer dispersion comprising an inert perfluorinated liquid, a polar solvent, and a surface active agent selected from the group consisting of certain branched and polymeric compounds containing both pendent aliphatic and pendent fluoroaliphatic chains. In another aspect, the present invention provides a method of coating a fluoropolymer onto an object or substrate using the aforementioned stable fluoropolymer dispersion. In yet another aspect, this invention provides a homogeneous emulsion comprising a perfluorinated liquid, a polar solvent, and a surface active agent selected from the group consisting of certain branched and polymeric compounds containing both pendent aliphatic and pendent fluoroaliphatic chains.

Industrial users of fluoropolymer dispersions desire a non-ozone depleting fluoropolymer dispersion system wherein the properties of the dispersant solvents are adaptable to processing conditions. Perfluorinated liquids are ideally suited for such applications. Perfluorinated liquids as a group are volatile, chemically inert, nontoxic, and nonflammable. In addition, since these liquids are chlorine-free, they do not contribute to environmental ozone depletion, and because they exhibit better materials compatibility than hydrochlorofluorocarbons, they do not destroy underlying substrates.

DETAILED DESCRIPTION OF INVENTION

For the purposes of this invention, a dispersion is considered to be stable when, upon combination of its constituent elements without the use of aggressive mixing means such as high shear mixing or temperature elevation, a homogeneous mixture is created that remains homogenous for at least 5 to 10 seconds, preferably for more than 30 seconds. However, because fluoropolymer dispersions used for coating applications are typically continuously agitated, the length of time for the dispersion to separate without agitation serves only as a relative measure of the quality of the dispersion and not as an absolute measure of its utility. Dispersions that meet other quality criteria and remain dispersed with agitation but do not remain stable for a long period of time without agitation are nonetheless considered useful and are within the scope of the present invention. "Non-ozone depleting" is taken for the purposes of this invention to mean that the dispersion contains no compounds or agents currently known to degrade atmospheric ozone.

The dispersion of this invention comprises four primary components: A perfluorinated solvent, a polar solvent, including water and polar organic solvents, a lubricious fluoropolymer, typically polytetrafluoroethylene, and a suitable surface active agent. The solvent system employed to create the dispersion, comprising the perfluorinated liquid and the polar co-solvent, may be created using any relative ratio of solvent compositions. Preferably, however, the resulting solvent system will have those properties most suitable for commercial coating applications, i.e. high volatility, chemical inertness, nontoxicity, and nonflammability. Typically, therefore, the solvent system will comprise a major amount of the perfluorinated liquid. Most preferably, the solvent system will comprise greater than 90 percent of the perfluorinated liquid by weight. It will be understood, however, that the present invention is not limited in scope to any particular ratio of solvents. The concentration of the particulate fluoropolymer in the dispersion generally will be between approximately 0.1 and 30 percent by weight of the total system. The concentration of the surfactant within the dispersion necessary to create a stable and homogeneous dispersion will vary with the particular system, but will typically be between approximately 0.01 and 5.0 percent of the system by weight.

The fluoropolymer dispersions of this invention may be prepared using any fluoropolymer which, when coated onto a selected substrate, forms a lubricious coating. Typically, such polymers are homopolymers of polytetrafluoroethylene which may be prepared, for example, according to methods described in U.S. Pat. Nos. 2,559,752 (Berry et al.) and 3,526,614 (Schindler et al.). These patents describe methods of batch polymerization of perfluorocarbon monomers in an aqueous medium using a dispersing agent and a water-soluble polymerization initiator to yield a concentrated dispersion of polymer in a colloidally dispersed state. The fluoropolymer dispersion may be prepared using either a dry powder of the fluoropolymer or a concentrated dispersion of the particulate fluoropolymer in a polar solvent such as water or isopropanol. The molecular weight of the particulate fluoropolymer is typically between approximately 2,000 and 100,000, and the concentrated dispersion typically contains from about 15 to about 30 weight percent solid particulate fluoropolymer. The concentrated fluoropolymer dispersion in the polar solvent may also contain small amounts of surfactants. Useful free-flowing fluoropolymer powder is commercially available as Tefloff™ Fluoroadditive, and useful concentrated fluoropolymer dispersions in a polar solvent are commercially available as Vydax™ Fluorotelomer Dispersion, both available from E.I. du Pont de Nemours and Company.

The perfluorinated liquids useful in the present invention are those which, in conjunction with the appropriate surface active agent and polar co-solvent, create a stable and homogeneous dispersion of the fluoropolymer and are easily evaporated under commercial coating process conditions from the coated substrate. Useful perfluorinated liquids typically contain from 5 to 18 carbon atoms and may optionally contain one or more catemary heteroatoms, such as divalent oxygen or trivalent nitrogen atoms. The term "perfluorinated liquid" as used herein includes organic compounds in which all (or essentially all) of the hydrogen atoms are replaced with fluorine atoms. Representative perfluorinated liquids include cyclic and non-cyclic perfluoroalkanes, perfluoroamines, perfluoroethers, perfluorocycloamines, and any mixtures thereof. Specific representative perfluorinated liquids include the following: perfluoropentane, perfluorohexane, perfluoroheptane, perfluorooctane, perfluoromethylcyclohexane, perfluorotributyl amine, perfluorotriamyl amine, perfluoro-N-methylmorpholine, perfluoro-N-ethylmorpholine, perfluoroisopropyl morpholine, perfluoro-N-methyl pyrrolidine, perfluoro-1,2bis(trifluoromethyl)hexafluorocyclobutane, perfluoro-2-butyltetrahydrofuran, perfluorotriethylamine, perfluorodibutyl ether, and mixtures of these and other perfluorinated liquids. Commercially available perfluorinated liquids that can be used in this invention include: Fluorinerff™ FC™-43 Electronic Fluid, Fluorinert™ FC™. 72 Electronic Fluid, Fluorinert™ FC™-77 Electronic Fluid, Fluorinert™ FC™-84 Electronic Fluid, Fluorinert™ FC™-87 Electronic Fluid, Performance Fluid™ PF-5060, Performance Fluid™ PF-5070, and Performance Fluid™ PF-5052. Some of these liquids are described in Fluorinert™ Electronic Fluids, product bulletin 98-6086(212)NPI, issued 2/91, available from 3M Co., St. Paul, Minn. Other commercially available perfluorinated liquids that are considered useful in the present invention include perfluorinated liquids sold as Galden™ LS fluids and Flutec™ PP fluids.

The polar co-solvents present in the solvent system of this invention include any polar solvent. Such polar solvents include water and polar organic solvents containing from 1 to 10 carbon atoms, such as low molecular weight alcohols, e.g. methanol, ethanol, propanol or isopropanol, ketones, glycol ethers, and any such mixtures thereof. Preferred polar co-solvents for use in the present invention are water and isopropanol. U.S. Pat. No. 5,089,152 (Flynn et al.), whose description is incorporated herein by reference, describes one suitable class of surface active compounds useful in this invention consisting of perfluoroaliphatic, carboxamido-, and sulfonamidoalkanols. Perfluoroaliphatic amidoalkanols represented by the following general formula and described by Flynn et al. are useful surface active agents in this invention:

wherein $R_f$ is a divalent, inert, perfluoroaliphatic group containing 3 to 20 carbon atoms, the skeletal chain of which may be straight chained, branch chained, and if sufficiently large, cyclic, or any such combination thereof. The skeletal chain also may optionally include one or more catemary divalent oxygen or trivalent nitrogen atoms bonded only to carbon atoms, such heteroatoms being a chemically stable linkage between fluorocarbon portions of the fluoroaliphatic group and not interfering with the inert character of the $R_f$ group.

$R^1$ is hydrogen or a lower alkyl group having 1 to 6 carbon atoms, which can be straight chained, branch chained or cyclic, or any such combination thereof.

$R^2$ is an aliphatic group containing 2 to 12 carbon atoms, and further contains at least one hydroxyl, one of which may be terminal. The skeletal chain of $R^2$ may be straight chained, branch chained, and if sufficiently large, cyclic, or any such combination thereof. The skeletal chain may also optionally include one or more caternary heteroatoms such as a divalent oxygen bonded only to carbon atoms.

Z is a carbonyl (CO) or sulfonyl ($SO_2$) group.

Y is fluorine, $F_5SCF_2$—, or $$R^1-\underset{\underset{R^2}{|}}{N}-Z-$$

wherein $R^1$ and $R^2$ are as previously defined.

Preferred surfactants of this type particularly useful in the present invention include the following compounds:

$$C_8F_{17}SO_2N-(CH_2CH_2O)_nH \quad (n=1-4)$$
$$\underset{C_2H_5}{|}$$

and $$C_4F_9OC_2F_4OCF_2\overset{O}{\overset{\|}{C}}NH(CH_2)_2OH$$

Another useful class of surfactants are those polymerized products formed from the reaction of certain fluorochemical acrylates with a suitable hydrophilic monomer such as acrylic acid, N-vinyl pyrrolidinone, methacrylic acid, or other hydrophilic monoacrylate. The chosen hydrophilic monomer cannot be one that when polymerized with the fluorochemical acrylate results in a significant amount of crosslinking in the polymerized product, such as where the hydrophilic monomer contains more than one acrylate functional group. The following general formula describes the fluorochemical acrylate monomer:

$$C_nF_{2n+1}(OC_pF_{2p})_x(OC_qF_{2q})_y(Q)_g(CH_2)_mO-\overset{O}{\overset{\|}{C}}-CX'=CH_2 \quad (II)$$

wherein p and q are integers between 1 and 4, x and y are integers between 0 and 4 inclusive, m may be 1 or 2, n may be an integer between 3 and 10 inclusive, X' may be either a methyl group or a single hydrogen atom, g may be 0 or 1, and Q is a sulfonamido constituent group according to the following formula:

$$-SO_2N-$$
$$\underset{R^1}{|}$$

wherein $R^1$, identical to that defined by Formula I above, is a hydrogen or a lower alkyl group having from 1 to 6 carbon atoms, which may be straight chained, branch chained, cyclic, or any such combination thereof. The other carbon chains of the fluorochemical acrylate monomer may also be either straight-chained or branched. The resulting polymer may also include a small amount of a chain transfer agent or polymerization initiator. Representative fluorochemical monomers that contain a sulfonamido constituent group include $C_8F_{17}SO_2N(C_2H_5)C_2H_4O_2CC(CH_3)=CH_2$ and $c_8F_{17}SO_2N(C_4H_9)CH_2CH_2O_2$ CCH=$CH_2$. Preferred fluoroacrylate monomers are 1,1dihydroperfluorooctyl methacrylate, sometimes referred to as FOMA, and 1,1,2,2tetrahydroperfluorododecyl acrylate. The constituent monomers are combined in weight ratios corresponding to between five and twenty-five weight percent of the hydrophilic monomer where the polar co-solvent to be used is a polar organic solvent such as low molecular weight alcohols, ketones, and glycol ethers. The constituent monomers are combined in weight ratios corresponding to between one and twenty-five weight percent of the hydrophilic monomer where the polar co-solvent to be used is water.

The resulting polymerized surfactant product consists of randomly placed pendent perfluoroaliphatic and carboxylate groups as illustrated by the following formula for the particular preferred usage of acrylic acid as the hydrophilic monomer:

$$\sim\left[\begin{array}{c}X'\\|\\C-CH_2\\|\\O=C\\|\\O\\|\\(CH_2)_m(Q)_g[OC_qF_{2q}]_y[OC_pF_{2p}]_xC_nF_{2n+1}\end{array}\right]-----\left[\begin{array}{c}H\\|\\C-CH_2\\|\\C=O\\|\\OH\end{array}\right]-$$

wherein p, q, x, y, m, n, g, X', and Q are as previously defined.

U.S. Pat. Nos. 5,223,593 (McAllister et al.), 5,270,378 (Johnson et al.), and 5,380,644 (Yonkoski et al.) describe a method of batch polymerization suitable to produce these polymerized surfactants. According to the methods of these patents, a polymerizable mixture is created by dissolving the constituent monomers in desired weight ratios in ethyl acetate. The mixture is then degassed, isolated in a closed reaction vessel, and polymerized. The surfactant product is recovered as a solid following completion of the polymerization reaction. The surfactants of this invention may be made in an identical manner except that, because the polymeric compounds are insoluble in ethyl acetate, the constituent monomers must be dissolved in a suitable perfluorinated liquid.

A third class of surfactants useful in this invention are perfluorinated ether acids according to the following general formula:

$$C_zF_{2z+1}(OCF_2)_s(OC_2F_4)_t(OCFCF_2)_v(O)_wCYFC(O)OH \quad (IV)$$
$$\underset{CF_3}{|}$$

wherein z may be between 1 and 10 inclusive, s may be from 0 to 4, t may be from 0 to 4, v may be from 0 to 5, w may be 0 or 1, and Y may be either F or $CF_3$. For a detailed description of the preparation of these fluorinated acids, see, e.g., Patricia M. Savu, *Fluorinated Higher Carboxylic Acids,* 11 Kirk-Othmer Encyclopedia of Chemical Technology 551–58 (4th ed. 1994). Such surfactants are commercially available, for example, as Krytox™ 157 FSM Fluorinated Oil from E.I. du Pont de Nemours and Company, Wilmington, Del., and as Fomblin™ Monoacid from Ausimont Corp., Morristown, N.J.

The concentration of the surfactant necessary to create a stable and homogeneous dispersion will vary somewhat according to the particular surfactant and solvent system of interest, but will in all cases be between approximately 0.01 and 5.0 weight percent of the total system. The lowest possible surfactant concentration is preferred to reduce the expense of the overall system as well as to avoid leaving significant surfactant residue on a fluoropolymer-coated surface. The surfactants of the present invention may be used to disperse a fluoropolymer in a perfluorinated liquid and a polar solvent for any relative ratio of the concentration of the perfluorinated liquid and the polar co-solvent. The dispersed fluoropolymer may be present in the system from approximately 0.1 to 30 weight percent.

The surfactants of this invention may also be used to create a homogeneous emulsion of a perfluorinated liquid and a polar solvent in an identical manner as described above to disperse a fluoropolymer in a perfluorinated liquid and a polar solvent. The preferred surfactant class for this use are the polymerized surfactants that contain at least five percent hydrophilic monomer by weight. These surfactants may be used to create an emulsion of a perfluorinated liquid and a polar solvent for any relative ratio of the concentration of the perfluorinated liquid and the polar cosolvent. When these constituent solvents are present in equal volume concentrations, approximately 0.5 weight percent of the polymerized surfactant will create a homogeneous emulsion.

The preferred system for use in coating processes is obtained by diluting a commercially-available 30 weight percent fluoropolymer dispersion in a polar organic solvent to approximately 1.5 weight percent fluoropolymer using a perfluorinated liquid. The resulting system comprises approximately 1.5 weight percent fluoropolymer, 95 weight percent perfluorinated liquid, and approximately 3.5 weight percent polar co-solvent. For such a system, approximately 0.5 weight percent of a polymerized surfactant or approximately 3 weight percent of a perfluoroaliphatic amidoalkanol or approximately 2 weight percent of a perfluorinated ether acid is sufficient to create a homogeneous dispersion.

Representative articles that may be coated using a dispersion of the present invention to apply a fluoropolymer as a lubricating agent include the following: medical instruments, e.g. surgical staplers, razor blades, or surgical blades, photographic equipment, e.g. focusing barrels, zippers, musical instrument valves, and magnetic cartridges, e.g. video and audio tapes. The fluoropolymer dispersions of this invention may also be used to apply a fluoropolymer as a mold release agent and as a release primer for a variety of coated parts such as electric motor windings.

The following examples are offered to aid in a better understanding of the present invention. These examples present and evaluate a number of useful surfactants according to the general formulas previously defined. This list is not to be construed as an exhaustive compilation of all surfactants useful in the present invention and the examples are not to be unnecessarily construed as limiting the scope of this invention.

EXAMPLES

In the following Examples and Comparative Examples, fluoropolymer dispersions were prepared by measuring a commercially available concentrated PTFE dispersion into a vial, and subsequently adding a quantity of perfluoro-N-methyl morpholine sufficient to produce approximately a 1.5 percent solids dispersion by weight. The surfactant, either neat or in solution of the same or different inert liquid, was added dropwise and the vial agitated. If a stable dispersion formed, the dispersion was evaluated as described below and the weight percent of added surfactant was calculated and recorded. If a stable dispersion did not form, additional surfactant was added dropwise and the procedure repeated.

Once a stable dispersion was prepared, the time in seconds for the fluoropolymer to settle out of the solvent system was recorded. In some Examples, a dispersion having a higher concentration of surfactant was additionally prepared and the time required for the dispersion to break, or lose its homogeneity and separate, at this higher concentration was recorded. The dispersion was also evaluated as to homogeneity and assigned one of the ratings shown as follows:

| Rating | Rating description |
| --- | --- |
| 1 Poor | Agglomerated PTFE - not useful |
| 2 Fair | Some agglomeration; extensive grainy or waxy coating on the surface of the glass vial |
| 3 Good | Homogeneous dispersion; some grainy coating on the glass vial |
| 4 Very Good | Homogeneous dispersion; little or no grainy coating on the glass vial |

For the purposes of this invention, a rating at least 2.5 is preferred to create a homogeneous dispersion.

The following abbreviations were used to denote individual surfactants:

"43MA/AA" is a copolymer of $C_4F_9OCFCF_3CH_2O(CO)C(CH_3)=CH_2$ and acrylic acid using the weight percent of the constituent monomers shown in the Table.

"C9/AA" is a copolymer of $C_9F_{19}CH_2CH_2O(CO)CH=CH_2$ and acrylic acid using the weight percent of the constituent monomers shown in the Table.

"FOMA/AA" is a copolymer of $C_7F_{15}CH_2O(CO)C(CH_3)=CH_2$ and acrylic acid using the weight percent of the constituent monomers shown in the Table.

"FOMA/AA 1%" is the same copolymer additionally containing 1% methyl thioglycolate as a chain-transfer agent.

"FOMA/NVP" is a copolymer of $C_7F_{15}CH_2O(CO)C(CH_3)=CH_2$ and N-vinyl pyrrolidinone using the weight percent of the constituent monomers shown in the Table.

"EtFOSEMA/CW-Acrl" is a copolymer of $C_8F_{17}SO_2N(C_2H_5)$ $C_2H_4O_2CC(CH_3)=CH_2$ and Carbowax-750 acrylate (30:70) prepared according to the procedure described in Example 2 of U.S. Pat. No. 3,787,351 (Olson).

"BuFOSEA/Pluronic acrylate" is a copolymer of $C_8F_{17}SO_2N(C_4H_9)CH_2CH_2O_2CCH=CH_2$ and Pluronic-44 acrylate (30:70) prepared according to the procedure described in Example 1 of U.S. Pat. No. 3,787,351 (Olson).

"EtFOSEMA/ODMA" is a copolymer of $C_8F_{17}SO_2N(C_2H_5)C_2H_4O_2CC(CH_3)=CH_2$ and octadecyl methacrylate (50:50) prepared according to the procedure described in Example 3 of U.S. Pat. No. 3,787,351 (Olson).

"Fomblin™ monoacid" is a polyoxyperfluoroalkanoic acid available commercially from Ausimont corporation of Morristown, N.J.

Krytox™ 157FS fluorinated oil is a perfluoropolyether carboxylic acid available commercially from Du Pont corporation of Wilmington, Del.

The structures of other surfactants are shown in the Tables. The calculated weight percent of the fluoropolymer in the dispersion is denoted as "wt. % PTFE." The calculated final weight percent of the surfactant used in preparing the dispersion is denoted by "wt. % surfactant. "Sep'n time" is the time in seconds for the resulting dispersion to lose its homogeneity and separate. "n/a" indicates that the dispersion did not become homogeneous or that the separation was immediate.

For the following Examples and Comparative Examples Vydax™ TMAR/IPA Fluorotelomer Dispersion, commercially available from E.I. du Pont de Nemours and Company, was used. The product is a 30 weight percent dispersion in isopropanol of PTFE having an average molecular weight of 3,700. In the following Examples, surfactants used in the composition of this invention were tested at differing concentrations, and the resulting dispersions were evaluated as previously described. Table 1 presents the results.

dispersion. The preferred surfactant class, on the combined basis of qualitative dispersion rating, separation time and mount of surfactant required to create a quality dispersion

TABLE 1

| Ex. | wt. % PTFE | Surfactant Name | wt. % Surf. | Rating | sep'n time (sec) |
|---|---|---|---|---|---|
| C-1 | 1.5 | No Surfactant | — | 1 | n/a |
| 1 | 1.57 | 43MA/AA 95/5 | 0.23 | 3.5 | 75 |
| 2 | 1.49 | 43MA/AA 95/5 | 0.57 | 4 | 120 |
| 3 | 1.5 | C9/AA 90/10 | 0.3 | 2.5 | 20 |
| 4 | 1.5 | C9/AA 90/10 | 1.20 | 2 | 22 |
| 5 | 1.5 | C9/AA 90/10 | 2.40 | 2 | 65 |
| C-2 | 1.17 | $C_4F_9OC_2F_4OCF_2(CO)NHCH_2CH_2OH$ | 2.36 | 1 | n/a |
| 6 | 1.34 | $C_4F_9OC_2F_4OCF_2(CO)NHCH_2CH_2OH$ | 2.77 | 4 | 150 |
| 7 | 1.52 | $C_4F_9OC_2F_4OCF_2(CO)NHCH_2CH_2OH$ | 4.03 | 4 | 150 |
| 8 | 1.5 | FOMA/AA 80/20 | 0.32 | 3 | 120 |
| 9 | 1.44 | FOMA/AA 80/20 | 0.96 | 3 | 150 |
| 10 | 1.49 | FOMA/AA 80/20 1% | 0.22 | 4 | 45 |
| 11 | 1.44 | FOMA/AA 80/20 1% | 1.08 | 3.5 | 60 |
| 12 | 1.5 | FOMA/AA 87/13 | 0.12 | 4 | 60 |
| 13 | 1.5 | FOMA/AA 87/13 | 0.25 | 4 | 120 |
| 14 | 1.45 | FOMA/AA 87/13 | 0.37 | 4 | 180 |
| 15 | 1.59 | FOMA/AA 90/10 | 0.11 | 4 | 90 |
| 16 | 1.48 | FOMA/AA 90/10 | 0.19 | 4 | 120 |
| 17 | 1.49 | FOMA/AA 90/10 | 0.21 | 4 | 20 |
| 18 | 1.48 | FOMA/AA 90/10 | 0.42 | 3.5 | 420 |
| 19 | 1.48 | FOMA/AA 95/5 | 0.07 | 3.5 | 55 |
| 20 | 1.98 | FOMA/AA 95/5 | 0.47 | 3.5 | 75 |
| C-3 | 1.50 | FOMA/AA 98/2 | 5.01 | 1 | n/a |
| C-4 | 1.50 | FOMA/AA 99/1 | 1.90 | 1 | n/a |
| 21 | 1.49 | FOMA/NVP 95/5 | 0.39 | 4 | 60 |
| 22 | 1.40 | FOMA/NVP 95/5 | 1.61 | 3.5 | 60 |
| 23 | 1.50 | $C_8F_{17}SO_2NC_2H_5(CH_2CH_2O)_nH$ (n = 1–4) | 1.83 | 2.5 | 10 |
| 24 | 1.52 | $C_8F_{17}SO_2NC_2H_5(CH_2CH_2O)_nH$ (n = 1–4) | 2.89 | 3 | 20 |
| 25 | 1.50 | $C_8F_{17}SO_2NC_2H_5(CH_2CH_2O)_nH$ (n = 1–4) | 4.69 | 3 | 20 |
| 26 | 1.58 | EtFOSEMA/CW-Acrl | 0.46 | 3 | 12 |
| 27 | 1.50 | EtFOSEMA/CW-Acrl | 1.06 | 3.5 | 40 |
| 28 | 1.50 | EtFOSEMA/CW-Acrl | 2.49 | 3.5 | 40 |
| C-5 | 1.55 | EtFOSEMA/ODMA | 1.18 | 1.5 | n/a |
| C-6 | 1.55 | BuFOSEA/Pluronic acrylate | 1.5 | 1.5 | n/a |
| C-7 | 1.56 | $C_8F_{17}SO_2N(C_2H_5)(C_nH_{2n}O)_{5.5}CH_3$ | 2.19 | 1.5 | n/a |
| 29 | 1.45 | $C_8F_{17}SO_2N(C_2H_5)(C_nH_{2n}O)_{13}H$ | 2.36 | 2 | n/a |
| C-8 | 1.48 | $C_6F_{13}OC_2F_4CO_2H$ | 0.67 | 1 | n/a |
| C-9 | 1.50 | $C_6F_{13}OC_2F_4CO_2H$ | 1.39 | 1 | n/a |
| 30 | 1.50 | $C_6F_{13}OC_2F_4CO_2H$ | 2.77 | 3 | 110 |
| 31 | 1.48 | $C_6F_{13}OC_2F_4CO_2H$ | 2.78 | 3.5 | 180 |
| 32 | 1.24 | Fomblin ™ monoacid | 3.31 | 3.5 | 85 |
| 33 | 1.48 | Fomblin ™ monoacid | 3.27 | 3 | 85 |
| 34 | 1.17 | Krytox ™ 157FS fluorinated oil | 4.44 | 3.5 | 65 |
| 35 | 1.48 | Krytox ™ 157FS fluorinated oil | 1.86 | 3 | 30 |

As can be seen in the data of Table 1, useful dispersions of polytetrafluoroethylene, a perfluorinated liquid and isopropanol can be prepared using the method of this invention. When isopropanol is used as the polar solvent, the polymerized surfactant must contain at least 5 weight percent of the hydrophilic monomer. Those that contain less than 5 weight percent (see Comparative Examples 3 and 4) or do not contain a hydrophilic monomer (Comparative Examples 5) or that contain a crosslinked, polymeric surfactant (Comparative Example 6) do not produce useful dispersions. Separation time generally increased with surfactant concentration indicating that surfactant performance generally increases with the amount of the surfactant within the dispersion. The preferred surfactant class, on the combined basis of qualitative dispersion rating, separation time and mount of surfactant required to create a quality dispersion appears to be the FOMA/AA class that contain between 5 and 20 weight percent AA monomer, with a most preferred AA concentration between 10 and 13 weight percent. For the following Examples Vydax™ ARW Fluorotelomer Dispersion, commercially available from E.I. du Pont de Nemours and Company, was used. The product is a 20 weight percent dispersion in water of PTFE having an average molecular weight of 3,700. In the following Examples, surfactants used in the composition of this invention were tested at differing concentrations, and the resulting dispersions were evaluated as previously described. Table 2 presents the results.

TABLE 2

| Ex. | wt. % PTFE | Surfactant Name | wt. % Surf. | Rating | sep'n time (sec) |
|---|---|---|---|---|---|
| C-10 | 1.5 | No Surfactant | — | 1 | n/a |
| 36 | 1.59 | 43MA/AA 95/5 | 0.09 | 3 | 75 |

TABLE 2-continued

| Ex. | wt. % PTFE | Surfactant Name | wt. % Surf. | Rating | sep'n time (sec) |
|---|---|---|---|---|---|
| 37 | 1.49 | 43MA/AA 95/5 | 0.5 | 3.5 | 120 |
| 38 | 0.83 | C9/AA 90/10 | 1.58 | 3 | — |
| 39 | 0.94 | $C_4F_9OC_2F_4OCF_2(CO)NHCH_2CH_2OH$ | 0.05 | 4 | 120 |
| 40 | 1.0 | $C_4F_9OC_2F_4OCF_2(CO)NHCH_2CH_2OH$ | 0.14 | 4 | 60 |
| 41 | 1.5 | FOMA/AA 80/20 | 0.39 | 3 | 60 |
| 42 | 1.45 | FOMA/AA 80/20 | 0.91 | 3 | 100 |
| 43 | 1.36 | FOMA/AA 80/20 | 1.5 | 3 | 150 |
| 44 | 1.47 | FOMA/AA 80/20 1% | 0.6 | 3 | 90 |
| 45 | 1.37 | FOMA/AA 80/20 1% | 1.18 | 3.5 | 180 |
| 46 | 1.49 | FOMA/AA 87/13 | 0.56 | 2.5 | 60 |
| 47 | 1.36 | FOMA/AA 87/13 | 0.94 | 2.5 | 75 |
| 48 | 1.51 | FOMA/AA 90/10 | 0.04 | 3 | 90 |
| 49 | 1.4 | FOMA/AA 90/10 | 0.55 | 3.5 | 180 |
| 50 | 1.44 | FOMA/AA 90/10 | 0.77 | 3 | 90 |
| 51 | 0.94 | FOMA/AA 98/2 | 0.58 | 3 | 120 |
| 52 | 1.50 | FOMA/AA 98/2 | 0.50 | 2 | 14 |
| 53 | 1.49 | FOMA/AA 98/2 | 1.84 | 2.5 | 28 |
| 54 | 1.46 | FOMA/NVP 95/5 | 0.75 | 2 | 60 |
| 55 | 1.4 | FOMA/NVP 95/5 | 1.44 | 2 | 60 |
| 56 | 1.49 | EtFOSEMA/CW-Acryl | 0.47 | 2.5 | 50 |
| 57 | 1.50 | EtFOSEMA/CW-Acryl | 1.02 | 3 | 55 |
| 58 | 1.50 | EtFOSEMA/CW-Acryl | 2.07 | 2.5 | 45 |
| 59 | 1.50 | EtFOSEMA/CW-Acryl | 4.02 | 3 | 120 |
| 60 | 0.95 | $C_8F_{17}SO_2NC_2H_5(CH_2CH_2O)_nH$ (n = 1–4) | 0.09 | 3 | 10 |
| 61 | 0.92 | $C_8F_{17}SO_2NC_2H_5(CH_2CH_2O)_nH$ (n = 1–4) | 0.19 | 4 | 180 |
| 62 | 1.50 | $C_6F_{13}OC_2F_4CO_2H$ | 0.53 | 3.5 | 240 |
| 63 | 1.50 | $C_6F_{13}OC_2F_4CO_2H$ | 0.75 | 3.5 | 240 |
| 64 | 1.49 | $C_6F_{13}OC_2F_4CO_2H$ | 1.04 | 3.5 | 240 |
| 65 | 1.48 | Fomblin ™ monoacid | 1.79 | 4 | 180 |
| 66 | 1.50 | Fomblin ™ monoacid | 0.50 | 3 | 120 |
| 67 | 1.54 | Krytox ™ 157SM | 1.26 | 4 | 175 |
| 68 | 1.50 | Krytox ™ 157SM | 0.53 | 4 | 125 |

As can be seen in the data of Table 2, useful dispersions of polytetrafluoroethylene, a perfluorinated liquid and water can be prepared using the method of this invention. When water is used as the polar solvent, the polymerized surfactant may contain less than 5 weight percent of the hydrophilic monomer, although having greater than 5 weight percent is preferred. The preferred surfactant for use with a perfluorinated liquid and water is the carboxamidoalkanol. Although this material displayed a shortening of separation time with increased surfactant, the dispersion rating did not suffer. The efficacy at concentrations of 0.05 weight percent is very positive. The sulfonamidoalkanol also displayed good performance, exhibiting efficacy at low concentration levels.

For the following Examples Vydax™ HD Fluorotelomer Dispersion, commercially available from E.I. du Pont de Nemours and Company, was used. The product is a dry PTFE powder having an average molecular weight between 70,000 and 100,000. The Vydax$^{TM}$ HD Fluorotelomer Dispersion was first dispersed in isopropanol at 30 weight percent, then further dispersed in perfluoro-N-methyl morpholine to about 1.5 weight percent using the composition and method of this invention. In the following Examples, surfactants used in the composition of this invention were tested at differing concentrations, and the resulting dispersions were evaluated as previously described. Table 3 presents the results.

TABLE 3

| Ex. | wt. % PTFE | Surfactant Name | wt. % Surf. | Rating | sep'n time (sec) |
|---|---|---|---|---|---|
| 69 | 1.54 | 43MA/AA 95/5 | 0.15 | 3 | 90 |
| 70 | 1.5 | 43MA/AA 95/5 | 0.18 | 3.5 | 180 |
| 71 | 1.50 | $C_4F_9OC_2F_4OCF_2(CO)NHCH_2CH_2OH$ | 1.01 | 3.5 | 75 |
| 72 | 1.49 | $C_4F_9OC_2F_4OCF_2(CO)NHCH_2CH_2OH$ | 2.05 | 4 | 80 |
| 73 | 1.50 | $C_4F_9OC_2F_4OCF_2(CO)NHCH_2CH_2OH$ | 3.00 | 4 | 90 |
| 74 | 1.45 | FOMA/AA 80/20 | 0.55 | 3.5 | 30 |
| 75 | 1.43 | FOMA/AA 80/20 | 0.85 | 3.5 | 45 |
| 76 | 1.52 | FOMA/AA 80/20 1% | 0.15 | 3.5 | 180 |
| 77 | 1.39 | FOMA/AA 80/20 1% | 1.46 | 3.5 | 90 |
| 78 | 1.48 | FOMA/AA 87/13 | 0.14 | 3.5 | 120 |
| 79 | 1.48 | FOMA/AA 87/13 | 0.31 | 3.5 | 180 |

TABLE 3-continued

| Ex. | wt. % PTFE | Surfactant Name | wt. % Surf. | Rating | sep'n time (sec) |
|---|---|---|---|---|---|
| 80 | 1.5 | FOMA/NVP 95/5 | 0.35 | 3.5 | 90 |
| 81 | 1.43 | FOMA/NVP 95/5 | 1.28 | 3.5 | 60 |
| 82 | 1.02 | $C_8F_{17}SO_2NC_2H_5(CH_2CH_2O)_nH$ n = 1–4 | 0.23 | 3.5 | 60 |
| 83 | 1.47 | $C_8F_{17}SO_2NC_2H_5(CH_2CH_2O)_nH$ n = 1–4 | 0.67 | 3.5 | 30 |
| 84 | 1.3 | $C_8F_{17}SO_2NC_2H_5(CH_2CH_2O)_nH$ n = 1–4 | 1.1 | 3.5 | 90 |

As can be seen from the data in Table 3, useful dispersions of polytetrafluoroethylene can be prepared from dry powder by addition of isopropanol as the polar solvent.

In the following Examples useful emulsions of perfluorinated liquids and a polar solvent were prepared and evaluated using polymerized surfactants and the method of this invention. In each Example, 3 mL each of perfluoro-Nmethylmorpholine and the polar solvent were added to a glass vial followed by a measured quantity of a polymerized surfactant. The vials were agitated and the time, in seconds, for the resulting dispersion to lose is homogeneity and separate was recorded. The surfactant evaluated was "FOMA/AA" with the weight ratios of monomers shown in Table 4.

TABLE 4

| Example | Polar Solvent | Surfactant | Wt. % Surfactant | Separation time (sec.) |
|---|---|---|---|---|
| 85 | Isopropanol | FOMA/AA 90/10 | 0.046 | 30 |
| 86 | Isopropanol | FOMA/AA 90/10 | 0.146 | 75 |
| 87 | Isopropanol | FOMA/AA 95/5 | 0.598 | 240 |
| 88 | Isopropanol | FOMA/AA 98/2 | 0.43 | 140 |
| 89 | Isopropanol | FOMA/AA 98/2 | 0.57 | 140 |
| C-11 | Isopropanol | FOMA/AA 99/1 | 0.05 | 0 |
| C-12 | Isopropanol | FOMA/AA 99/1 | 0.15 | 0 |
| 90 | Water | FOMA/AA 90/10 | 0.34 | 15 |
| 91 | Water | FOMA/AA 95/5 | 1.07 | 16 |
| C-13 | Water | FOMA/AA 98/2 | 0.53 | 0 |
| C-14 | Water | FOMA/AA 98/2 | 1.91 | 0 |
| C-15 | Water | FOMA/AA 99/1 | 0.16 | 0 |
| C-16 | Water | FOMA/AA 99/1 | 0.34 | 0 |

As can be seen from the results in Table 4, useful emulsions can be prepared using polymeric surfactants having a hydrophilic monomer, when the content of the hydrophilic monomer is at least 5 weight percent. When the content is less than 5 percent by weight, the emulsion immediately separates. In the following Examples the weight percent polytetrafluoroethylene and the surfactant concentration were held constant and the concentration of the perfluorinated liquid and the polar solvent were varied. In all of the Examples listed in Tables 5 and 6, the perfluorinated liquid used was perfluoro-N-methyl morpholine. In the Examples of Table 5 the polar solvent used was isopropanol, while water was used in the Examples of Table 6.

TABLE 5

| Ex. | Wt % PTFE | Surfactant | Wt % Surfactant | Wt % Isopropanol | Rating | Sep'n Time (sec) |
|---|---|---|---|---|---|---|
| 92 | 151 | FOMA/AA 90/10 | 0.01 | 3.63 | 3.5 | 96 |
| 93 | 1.49 | FOMA/AA 90/10 | 0.04 | 7.18 | 4 | 60 |
| 94 | 1.49 | FOMA/AA 90/10 | 0.03 | 14.92 | 3 | 75 |
| 95 | 1.50 | FOMA/AA 90/10 | 0.03 | 30.0 | 2.5 | 70 |
| 96 | 1.45 | FOMA/AA 90/10 | 0.12 | 3.5 | 4 | 60 |
| 97 | 1.45 | FOMA/AA 90/10 | 0.11 | 7.89 | 3.5 | 15 |
| 98 | 1.50 | FOMA/AA 90/10 | 0.11 | 15.03 | 3.5 | 25 |
| 99 | 1.49 | FOMA/AA 90/10 | 0.12 | 29.75 | 3 | 90 |
| 100 | 1.44 | FOMA/AA 90/10 | 0.33 | 3.47 | 4 | >600 |
| 101 | 1.43 | FOMA/AA 90/10 | 0.30 | 6.94 | 3.5 | 600 |
| 102 | 1.47 | FOMA/AA 90/10 | 0.32 | 14.77 | 3.5 | >600 |
| 103 | 1.52 | FOMA/AA 90/10 | 0.33 | 30.50 | 3 | 420 |

TABLE 6

| Ex. | Wt % PTFE | Surfactant | Wt % Surfactant | Wt % Water | Rating | Sep'n Time (sec) |
|---|---|---|---|---|---|---|
| 104 | 1.50 | $C_4F_9OC_2F_4OCF_2(CO)NHCH_2CH_2OH$ | 0.07 | 6.59 | 4 | 60 |
| 105 | 1.50 | $C_4F_9OC_2F_4OCF_2(CO)NHCH_2CH_2OH$ | 0.07 | 13.22 | 4 | 70 |
| 106 | 1.50 | $C_4F_9OC_2F_4OCF_2(CO)NHCH_2CH_2OH$ | 0.07 | 26.59 | 3 | 25 |
| 107 | 1.50 | $C_4F_9OC_2F_4OCF_2(CO)NHCH_2CH_2OH$ | 0.07 | 52.96 | 3.5 | >600 |
| 108 | 1.50 | $C_4F_9OC_2F_4OCF_2(CO)NHCH_2CH_2OH$ | 0.14 | 6.61 | 4 | 90 |
| 109 | 1.50 | $C_4F_9OC_2F_4OCF_2(CO)NHCH_2CH_2OH$ | 0.13 | 13.23 | 4 | 100 |

TABLE 6-continued

| Ex. | Wt % PTFE | Surfactant | Wt % Surfactant | Wt % Water | Rating | Sep'n Time (sec) |
|---|---|---|---|---|---|---|
| 110 | 1.50 | $C_4F_9OC_2F_4OCF_2(CO)NHCH_2CH_2OH$ | 0.12 | 26.6 | 3.5 | 180 |
| 111 | 1.50 | $C_4F_9OC_2F_4OCF_2(CO)NHCH_2CH_2OH$ | 0.13 | 52.90 | 3.5 | >600 |
| 112 | 1.48 | $C_4F_9OC_2F_4OCF_2(CO)NHCH_2CH_2OH$ | 0.30 | 6.50 | 4 | 120 |
| 113 | 1.50 | $C_4F_9OC_2F_4OCF_2(CO)NHCH_2CH_2OH$ | 0.31 | 13.39 | 4 | 115 |
| 114 | 1.50 | $C_4F_9OC_2F_4OCF_2(CO)NHCH_2CH_2OH$ | 0.30 | 26.32 | 3.5 | 110 |
| 115 | 1.50 | $C_4F_9OC_2F_4OCF_2(CO)NHCH_2CH_2OH$ | 0.30 | 52.94 | 3.5 | >600 |

As can be seen in the data of Tables 5 and 6, useful dispersions of PTFE can be prepared using a wide range of concentrations of both the perfluorinated liquid and the polar solvent.

Various modifications and alterations of this invention will become apparent to those skilled in the art without departing from the scope and spirit of the present invention, and it should be understood that this invention is not to be unduly limited to the illustrative embodiments set forth hereinabove.

We claim:

1. A homogeneous and non-ozone depleting dispersion comprising a lubricious fluoropolymer, an inert perfluorinated liquid, a polar solvent, and an effective amount of a surface active agent selected from the group consisting of:

a. perfluoroaliphatic amidoalkanols;
   b. polymerized products formed from the reaction of a mixture comprising a hydrophilic monomer and a monomer of the general formula:

$$C_nF_{2n+1}(OC_pF_{2p})_x(OC_qF_{2q})_y(Q)_g(CH_2)_mO-\overset{O}{\underset{\|}{C}}-CX'=CH_2$$

wherein p and q are integers between 1 and 4 inclusive, x and y are integers between 0 and 4 inclusive, m is 1 or 2, n is an integer between 3 and 10 inclusive, X' is either a methyl group or a single hydrogen atom, g is 0 or 1, and Q is a sulfonamido constituent group according to the formula:

$$-SO_2N-\underset{R^1}{|}$$

wherein $R^1$ is a hydrogen or a lower alkyl group having from 1 to 6 carbon atoms and wherein the hydrophilic monomer is present in an amount constituting inclusively between five and twenty-five weight percent of the reactant mixture when the polar solvent employed is a polar organic solvent and wherein the hydrophilic monomer is present in an amount constituting inclusively between one and twenty-five weight percent of the reactant mixture when the polar solvent employed is water; and c. Perfluorinated ether acids according to the general formula:

$$C_zF_{2z+1}(OCF_2)_s(OC_2F_4)_t(OCFCF_2)_v(O)_wCFYC(O)OH\underset{CF_3}{|}$$

wherein z is between 1 and 10 inclusive, s is between 0 to 4, t is between 0 to 4, v between 0 to 5, w is 0 or 1, and Y is either F or $CF_3$.

2. The liquid composition of claim 1 wherein the homogeneous and non-ozone depleting dispersion is stable.

3. The liquid composition of claim 1 wherein the fluoropolymer is polytetrafluoroethylene.

4. The liquid composition of claim 1 wherein the fluoropolymer is polytetrafluoroethylene and wherein the polar solvent is selected from the group consisting of water and low molecular weight alcohols having from 1 to 10 carbon atoms.

5. The liquid composition of claim 1 wherein the surface active agent is a polymerized product formed from the reaction of a mixture comprising between five and twenty-five percent by weight acrylic acid and between seventy-five and ninety-five percent by weight 1,1-dihydroperfluorooctyl methacrylate.

6. The liquid composition of claim 1 wherein the surface active agent is a polymerized product formed from the reaction of a mixture comprising a hydrophilic monomer selected from the group consisting of acrylic acid and N-vinyl pyrrolidinone and a monomer of the general formula:

$$C_nF_{2n+1}(OC_pF_{2p})_x(OC_qF_{2q})_y(Q)_g(CH_2)_mO-\overset{O}{\underset{\|}{C}}-CX'=CH_2$$

wherein p and q are integers between 1 and 4 inclusive, x and y are integers between 0 and 4 inclusive, m is 1 or 2, n is an integer between 3 and 10 inclusive, X' is either a methyl group or a single hydrogen atom, g is 0 or 1, and Q is a sulfonamido constituent group according to the formula:

$$-SO_2N-\underset{R^1}{|}$$

wherein $R^1$ is a hydrogen or a lower alkyl group having from 1 to 6 carbon atoms and wherein the hydrophilic monomer is present in an amount constituting inclusively between five and twenty-five weight percent of the reactant mixture when the polar solvent employed is a polar organic solvent and wherein the hydrophilic monomer is present in an amount constituting inclusively between one and twenty-five weight percent of the reactant mixture when the polar solvent employed is water.

7. The liquid composition of claim 1 wherein the surface active agent is a polymerized product formed from the reaction of a mixture comprising a hydrophilic monomer, a chain transfer agent, and a monomer of the general formula:

$$C_nF_{2n+1}(OC_pF_{2p})_x(OC_qF_{2q})_y(Q)_g(CH_2)_mO-\overset{O}{\underset{\|}{C}}-CX'=CH_2$$

wherein p and q are integers between 1 and 4 inclusive, x and y are integers between 0 and 4 inclusive, m is 1 or 2, n is an integer between 3 and 10 inclusive, X' may be either a methyl group or a single hydrogen atom, g may be 0 or 1, and Q is a sulfonamido constituent group according to the formula:

$$-SO_2N- \\ \phantom{-SO_2N}| \\ \phantom{-SO_2N}R^1$$

wherein $R^1$ is a hydrogen or a lower alkyl group having from 1 to 6 carbon atoms and wherein the hydrophilic monomer is present in an amount constituting inclusively between five and twenty-five weight percent of the reactant mixture when the polar solvent employed is a polar organic solvent and wherein the hydrophilic monomer is present in an amount constituting inclusively between one and twenty-five weight percent of the reactant mixture when the polar solvent employed is water.

8. The liquid composition of claim 7 wherein the hydrophilic monomer is selected from the group consisting of acrylic acid and N-vinyl pyrrolidinone.

9. The liquid composition of claim 1 wherein the surface active agent is selected from the group consisting of $$C_8F_{17}SO_2N-(CH_2CH_2O)_nH \quad (n=1-4) \\ \phantom{C_8F_{17}SO_2N}| \\ \phantom{C_8F_{17}SO_2N}C_2H_5$$

and $$C_4F_9OC_2F_4OCF_2\overset{O}{\underset{\|}{C}}NH(CH_2)_2OH.$$

10. The composition of claim 1 wherein the surface active agent is a polymerized product formed from the reaction of a mixture of a hydrophilic monomer and a monomer of the general formula:

$$C_nF_{2n+1}[OC_pF_{2p}]_x[OC_qF_{2q}]_ySO_2N(CH_2)_mO-\overset{O}{\underset{\|}{C}}-CX=CH_2 \\ \phantom{C_nF_{2n+1}[OC_pF_{2p}]_x[OC_qF_{2q}]_ySO_2N}| \\ \phantom{C_nF_{2n+1}[OC_pF_{2p}]_x[OC_qF_{2q}]_ySO_2N}R^1$$

wherein p and q are integers between 1 and 4 inclusive, x and y are integers between 0 and 4 inclusive, m is 1 or 2, n is an integer between 3 and 10 inclusive, X is either a methyl group or a single hydrogen atom, and $R^1$ is a hydrogen or a lower alkyl group having from 1 to 6 carbon atoms, which may be straight chained, branch chained, cyclic, or any such combination thereof, and wherein the hydrophilic monomer is present in an amount constituting inclusively between five and twenty-five weight percent of the reactant mixture.

11. The liquid composition of claim 1 wherein the composition contains between 0.1 and 30 weight percent of the fluoropolymer, between 50 and 99 weight percent of the inert perfluorinated liquid, between 1 and 49 weight percent of the polar solvent, and between 0.01 and 5 weight percent of the surface active agent.

12. The liquid composition of claim 11 wherein the fluoropolymer is polytetrafluoroethylene and wherein the polar solvent is selected from the group consisting of water and low molecular weight alcohols having from 1 to 10 carbon atoms.

* * * * *

UNITED STATES PATENT AND TRADEMARK OFFICE
CERTIFICATE OF CORRECTION

PATENT NO.: 5,532,310

DATED: July 2, 1996

INVENTOR(S): Mark W. Grenfell, Richard M. Flynn, and Patricia M. Savu

It is certified that error appears in the above-identified patent and that said Letters Patent is hereby corrected as shown below:

Col. 3, line 58, delete the word "Tefloff$^{TM}$" and insert --Teflon$^{TM}$--.

Col. 4, line 3, delete the word "catemary" and insert --catenary--.

Col. 4, line 21, delete the word "Fluorinerff$^{TM}$" and insert --Fluorinert--.

Col. 4, line 22, delete "FC$^{TM}$.72" and insert "FC$^{TM}$-72".

Col. 4, line 28, delete "98-6086" and insert --98-0211-6086--.

Col. 4, line 40, after the word "isopropanol.", insert new paragraph.

Col. 6, line 16, in the last line of the Equation, correct the line to read as follows "$(CH_2)_m[OC_qF_{2q}]_y(Q)_g[OC_pF_{2p}]_xC_nF_{2n+1}$".

Col. 8, line 63, delete "TMAR/IPA" and insert --AR/IPA--.

Col. 10, line 49, after the words "weight percent.", insert new paragraph.

Col. 13, lines 18-19, delete "perfluoro-Nmethylmorpholine" and insert --perfluoro-N-methylmorpholine--.

UNITED STATES PATENT AND TRADEMARK OFFICE
CERTIFICATE OF CORRECTION

PATENT NO. : 5,532,310

DATED : July 2, 1996

INVENTOR(S) : Mark W. Grenfell, Richard M. Flynn, and Patricia M. Savu

It is certified that error appears in the above-indentified patent and that said Letters Patent is hereby corrected as shown below:

Col. 13, line 48, after the words "immediately separates.", insert new paragraph.

Signed and Sealed this

Fifteenth Day of July, 1997

Attest:

BRUCE LEHMAN

Attesting Officer    Commissioner of Patents and Trademarks